United States Patent [19]

Harrah et al.

[11] Patent Number: 4,906,999
[45] Date of Patent: Mar. 6, 1990

[54] DETECTION SYSTEM FOR LOCATING AIRCRAFT

[76] Inventors: David G. Harrah, 1467 W. Aindale, Stow, Ohio 44224; David J. Kollar, 12104 Parker Dr., Chesterland, Ohio 44026

[21] Appl. No.: 335,033

[22] Filed: Apr. 7, 1989

[51] Int. Cl.[4] .............................................. H04K 3/00
[52] U.S. Cl. ...................................................... 342/20
[58] Field of Search ...................... 342/20, 30, 32, 123, 342/455, 456

[56] References Cited

U.S. PATENT DOCUMENTS

Re. 32,368  3/1987  Funatsu et al. .
4,318,102  3/1982  Poirier .
4,668,952  5/1987  Imazeki et al. .

Primary Examiner—Theodore M. Blum
Attorney, Agent, or Firm—Oldham & Oldham Co., L.P.A.

[57] ABSTRACT

A portable detection system, including a receiver tuned to the frequency of signals transmitted by an aircraft transponder, will detect the presence of an aircraft in proximity to the system. The system has signal processing circuitry to transform the received signals to indicate the altitude of the detected aircraft. A display or alarm may alert the user to the presence of an aircraft. The system is useful to determine whether an aircraft may be engaged in a speed detection and ticketing operation or the closeness of other aircraft. The aircraft detection system may be used in conjunction with a radar detection system to provide a means by which various methods of traffic control can be detected.

19 Claims, 5 Drawing Sheets

DETECTION SYSTEM FOR LOCATING AIRCRAFT

BACKGROUND OF THE INVENTION

This invention relates to a detecting system for detecting the proximity of an aircraft to the system and more particularly to a detecting system for determining whether an aircraft is within a particular distance and altitude from the system. The detecting system is particularly useful to give an indication whether or not an aircraft is within close proximity of an automobile in which the detecting system may be placed to determine whether the aircraft has the capability of tracking the automobile speed in an aircraft speed detection and ticketing operation.

Traffic control by the state or local authorities has recently developed into the use of radar speed detecting systems for measuring the speed of vehicles as they travel along public roads or highways. In this way, the authorities can easily determine whether a particular vehicle is exceeding the speed limit and would therefore be subject to ticketing for a traffic violation. In response to such systems, radar detecting units have been developed for use by motorists to determine when a radar speed detection system is being utilized in the vicinity of a vehicle being driven along the public roads or highways. In this way, the motorist can detect the use of radar speed detection equipment and adjust the speed of the vehicle to conform to the posted speed limit in the event that the speed limit is being exceeded to thereby avoid costly traffic violations.

As the authorities have recognized, the use of radar detecting systems inhibits the effectiveness of this method for regulating and controlling the flow of traffic on public roads and highways. There have thus been increasingly complex radar speed detection systems developed for enhancing the effectiveness of these procedures as well as other methods not requiring complex and expensive systems. In one method, the authorities may determine the speed of vehicles traveling on the public roads or highways by use of an aircraft which will fly at an elevation above the flow of traffic. The flow of traffic can be observed and the traveling of individual vehicles can be measured as to the time in which it takes a vehicle to traverse a predetermined distance so as to give an indication of the speed at which the vehicle is traveling. If it is found that a vehicle is traveling at speed exceeding the posted speed limits, the aircraft can then relay the information to the ground unit wherein the vehicle can be detained and ticketed for the violation of the traffic regulations.

In such aircraft speed detection and ticketing operations, the roadway may be marked with appropriate designations so that the authorities in the aircraft can determine when a particular vehicle has traversed a predetermined distance such as a number of miles or portions thereof. The time in which the vehicle traverses this distance can be measured from the aircraft and thereafter the speed of the vehicle can be determined very accurately. With this method, the driver of the vehicle will not be aware of the aircraft's presence and has no means by which the aircraft's presence can be determined. It has also been found that in other situations, such as the flying of privately owned aircraft or the like, that the presence of other aircraft in the vicinity thereof would be desirable information for the pilot of the individual aircrafts. Although it is assumed that the air traffic controller at an airport in the vicinity of any airborne aircraft would have notified the pilots if another airplane is in the vicinity thereof, such information is not otherwise readily obtainable by the pilots of aircraft unless they have an on-board radar system. In most cases, the aircraft is not equipped with any radar equipment and information on other aircraft in the vicinity of the flight path of an individual aircraft would be extremely beneficial to the pilot thereof.

There are various systems which have been found in the prior art for detecting the proximity of aircraft or the like near a predetermined region. Such systems have been extremely complex and are not able to be utilized by the common market. One such system is found in U.S. Pat. No. 4,318,102 which shows an intrusion detecting system yielding range and altitude measurements of aircraft or the like in the vicinity of an area to be secured. It is clear that such a system is mainly usable by the armed forces of a governmental entity for surveillance of the air space over the perimeter of a secure area. In this system, an RF perimeter intrusion detecting system for measuring both range and altitude of aircraft or the like which transgress the air space over a protected area is disclosed. The system includes a first receiver forming a monostatic radar and RF transmitter and a second receiver forming a bistatic radar system. A lookup intruder sensor comprising an upward looking guided wave structure around a secured area perimeter may be used as the transmitting and receiving antennas for the radar system. Once an aircraft or the like is detected by the radar system, processing equipment will derive both elevation and range information on the intruding aircraft. It is clear that this system is an extremely complex radar system to indicate breach of secured areas by unauthorized or hostile aircraft or the like. Such a system as well as virtually any radar system is not feasibly usable as means for detecting aircraft which may be part of an aircraft speed detection and ticketing operation or by aircraft to determine the proximity of other aircraft in the vicinity thereof.

Similarly, as seen in U.S. Pat. No. 3,320,616, there are known systems for detecting and monitoring the orbiting satellites which may be positioned above the planet in space. As seen in this patent, a thin wall of CW energy is erected to extend upwardly and satellites crossing through this energy will reflect a portion thereof for reception in radio interferometer equipment placed on the ground. The elevation of any satellite passing through the thin wall of CW energy may be computed from two electrical signals which are representative of the angular position of the satellite with respect to two receiver sites. Again, it is noted that complex equipment and calculations are necessary to determine the elevation of an orbiting body or the like. Clearly, such a system is not usable to provide altitude information to a common user for detecting the presence and proximity of an aircraft in the vicinity thereof.

It is known that airport and air traffic controllers have at their disposal complex radar systems for tracking and maintaining communication with various aircraft in the vicinity thereof. As more and more aircraft are present in the skies, increasing problems in maintaining safe and effective control over the flights of these aircraft have necessitated regulation which facilitates the detection and tracking of various aircraft by an air traffic controller.

Presently, an identification number comprising of four digits is assigned to any FAA licensed aircraft by the air traffic control system and the number can be changed from time to time by the controller. A transponder aboard the individual aircraft is initiated by impingement of radar signals directed outwardly from one or more air traffic control stations over the region in the vicinity of those stations. When initiated, the transponder will send a burst of data back with the reflected radar signal to the radar reception system and air traffic controller. The burst of data sent from the transponder includes the identification number currently assigned to the aircraft and includes information reflecting the reading of the aircraft's altimeter such that the air traffic controller can identify the aircraft as well as pin point its position and altitude. It should be evident that the burst of data directed from the transponder is not only sent back to the radar detection system with the reflected radar signals, but is omnidirectionally sent out from the transponder upon initiation by the radar sweep.

SUMMARY OF THE INVENTION

According to the foregoing, there has therefore been found a need to provide a portable detection system which can be utilized to determine the presence and proximity of an aircraft or the like in the vicinity of the system. A detection system having these capabilities while being relatively easy to manufacture and of a relatively low cost so as to be utilized by individuals to detect the presence and altitude of an aircraft is highly desirable. Such a system would enable the determination of whether the aircraft is part of an aircraft speed detection and ticketing operation as well as enabling pilots of individual aircraft to observe the presence and altitude of other aircraft which may be in the same region.

It is therefore a main object of the present invention to provide an aircraft detection system which is both portable and cost effective for use by an ordinary consumer.

It is another object of the invention to provide an aircraft detection system which will indicate the presence of an aircraft in the vicinity of the system as well as given indication of the altitude at which the aircraft is found.

It is yet another objection of the invention to provide an aircraft detection system which will receive signals sent out by the transponder aboard an aircraft in the vicinity of the system, and which will process the signals to give an indication of the altitude of the aircraft from which the transponder signals were received.

It is still another object of the invention to provide an aircraft detection system which may be used in conjunction with other traffic control detection systems so as to provide a means by which various methods of traffic control can be detected.

These and other objects of the invention are accomplished by means of a portable detection system for detecting the proximity of an aircraft which comprises a receiving means for reception of data sent out by a transponder located aboard an aircraft as well as associated circuitry for processing the data signals from the aircraft transponder to yield an indication of the altitude of the aircraft from which the data was received. There is also provided signaling means to indicate that data signals have been received from an aircraft transponder in the vicinity of the detection system and display means to indicate the altitude of the aircraft from which data signals were received.

The associated circuitry for processing the data signals received by the detection system allow for the selective operation of the signaling and display means. In this way, the indication of aircraft which lie outside a predetermined zone of interest, being the relative proximity of the detected aircraft can be discriminated against. Thus, although several aircraft may be in the vicinity of the detection system, only those within the zone of interest will affect functioning of the signaling means and display means for observation by the user of the system. The detection system also allows for continuous monitoring of the proximity of a detected aircraft and will yield an indication of any changes in the aircraft's altitude or if the aircraft flies out of the predetermined zone of interest. The associated circuit means also allows further discrimination of any received signals to yield an indication of whether the detected aircraft may be part of an aircraft speed detection and ticketing operation.

The aircraft detection system of the invention may also be utilized in conjunction with a conventional radar detection system or the like such that any speed detection and ticketing operation may be observed by the user of this system. In such an embodiment, the associated circuitry of the system will discriminate against a plurality of received signals so as to yield an indication of a selected speed detection method. For example, if both aircraft and radar signals were received by the detection system, the radar system could be made to override the aircraft detection so to yield an indication of the operation of radar in the vicinity of the system. In this situation, it is presumed that the operation of radar would preclude the aircraft speed detection method in the same area. It is, of course, recognized that the user of the detection system could be provided with the means to operate the detection system according to desired characteristics which may depend upon the location or other factors of which the user is aware. Thus, the aircraft detection system used in combination with a radar detection system may provide the user with a comprehensive means by which speed detection and ticketing operations can be identified.

BRIEF DESCRIPTION OF THE DRAWINGS

The objects and advantages of the aircraft detection system will become apparent upon a reading of the following detailed description in conjunction with the drawings wherein.

DETAILED DESCRIPTION OF THE INVENTION

Figure 1:
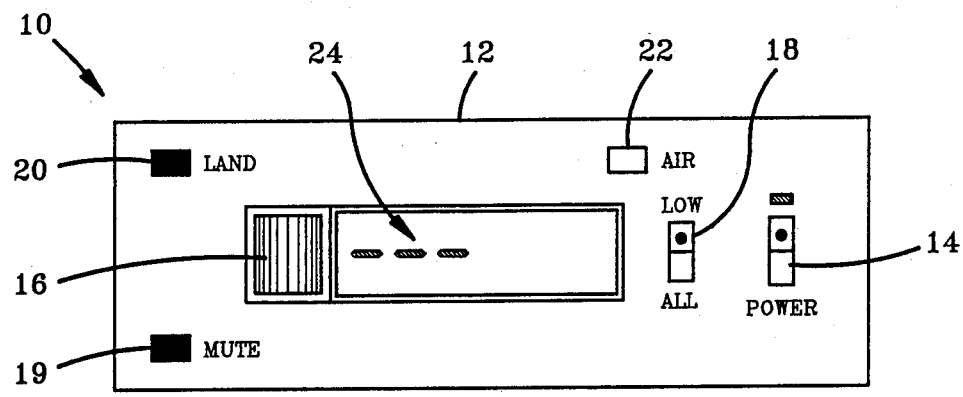
FIGS. 1 and 2 are front elevation views of a combined aircraft detection and radar detection system showing the detection unit and signaling and display mean associated therewith.

Referring now to FIG. 1, the detection system 10 is a small portable unit similar to that existing radar detection systems commonly available in the market place. The detection system 10 includes a housing 12 in which are provided the detection means and associated circuitry yielding an indication of detected radar signals or the proximity of an aircraft to the detection system. The unit 10 includes a plurality of user input switches and control means including an on/off power switch 14 as well as a signaling or alarm means volume control 16. A proximity or discrimination switch 18 is provided which may act as a means by which the radar detection system can be used in city or highway situations or to select a predetermined zone of interest for aircraft detection. Also as seen in FIG. 1, a plurality of lamp indicators may be supplied for indicating the detected signal being either a radar signal as shown at 20 or detected aircraft as shown at 22. There also may be included a mute button 19 which will silence the audio alert system for a predetermined amount of time the operation of, which will also be indicated on the display means 24 of the unit. The display means 24 in this embodiment of the invention constitutes a digital display means which may be a liquid crystal type display to indicate to the user the presence of traffic control operations or the like.

As seen in FIG. 1, the display means 24 may indicate a number of dashes or the like displayed on the liquid crystal display to indicate the signal intensity of a detected traffic control radar signal. Such a feature is a common method of displaying the impingement of radar signals on an automobile in which the detection system is utilized to give an indication of traffic control operations in the vicinity. The number dashes displayed on the display means indicate the signal intensity and therefore the proximity of the radar source to the vehicle. The associated circuitry of the detection system may also allow for the display of certain signals such as an R to indicate that traffic control radar is operating behind the target vehicle, or to indicate that the mute button has been operated by the user, or similar user functions. It is noted that when radar signals are detected by the unit, the land lamp 20 will be lit to give a further indication to the user that radar is being detected.

Figure 2:
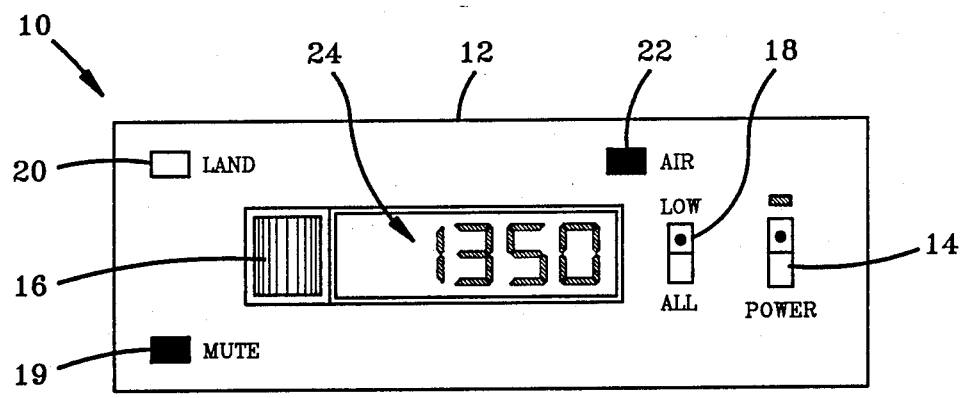

Turning now to FIG. 2, the presence of an aircraft in the proximity of the detection system is shown. When an aircraft is detected in the proximity of the system, the air lamp 22 will be lit indicating that an aircraft is in the vicinity of the target vehicle. Once illuminated, the air lamp 22 will remain on as long as the aircraft detected is in the vicinity of the vehicle. The audio alert or signaling means of the invention may be made to signal the detection of an aircraft in a different manner than that signifying detection of radar signals, for example, by signaling three times and then silencing to alert the user of the system of the detection of an aircraft. The display means 24 may be made to display the altitude of the detected aircraft in feet above sea level or above a bench mark altitude set by the user.

It has been recognized that in the conventional aircraft speed detection and ticketing operations, the aircraft conducting the speed detection will not fly above approximately 2500 feet above the road surface so as to ensure clear vision and accurate speed determinations of vehicles on the roadway. In this way, the user may control the detection system so as not to signal or display any detected aircraft flying an altitude of above 2500 feet or some predetermined altitude by means of switch 18. Thus, when the switch 18 is placed in a low position, only those aircraft detected which of flying altitudes of 2500 feet or below will cause the detection system to sound the alarm and display the altitude of the detected aircraft. Alternatively, the user may selective the all position of switch 18 such that any detected aircraft at any altitude will be displayed by the system.

It is also to be noted that the associated circuitry of the detection system may discriminate against a plurality of received signals so as to indicate the detection of an aircraft having the lowest altitude or if both land and air signals are received, to revert the system to land detection mode which will most likely be the method of traffic control being utilized.

Figure 3:
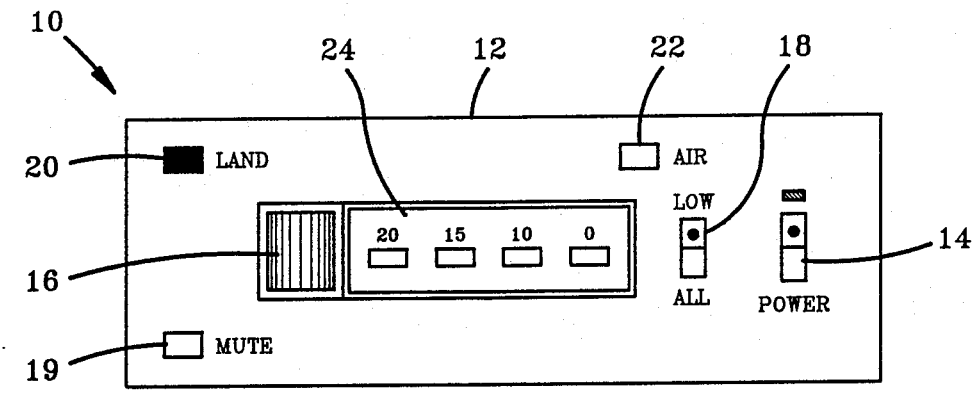
FIG. 3 is a front elevational view of an alternate embodiment of the combined aircraft detection and radar detection system of the invention.

As seen in FIG. 3, the detection system 10 may also be provided with an alternate display means 24 which may be a series of LED's which will indicate either the proximity of a detected radar signal by illuminating a number of the LED's depending upon the signal intensity of the radar signals received by the system. Alternatively, the LED's can display the altitude of a detected aircraft based upon a range in hundreds of feet or the like. Thus, the detection system of the invention may be provided with alternate display means to yield more or less features giving a more sophisticated or less costly unit to satisfy a broad range of buyers in the market place. It can be seen that the particular display means or signaling means may be adapted to perform various functions as desired by the user and manufacturer.

Figure 4:
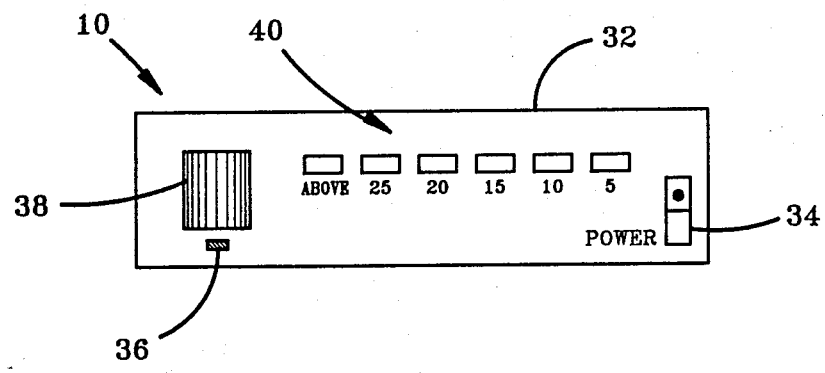
FIG. 4 is a front elevational view of an aircraft detection system in accordance with the invention.

Turning now to Pig. 4, there is shown an aircraft detection system which does not include a radar detection system as described with reference to FIGS. 1-3. In this embodiment, only detection of aircraft in the vicinity of the target vehicle is indicated thereby. In this embodiment, the unit 30 comprises a housing 32 and includes user input switches such as a off/on switch 34 and an audio alert volume control 38. An off/on indicator LED 36 may be provided as well as a display means 40 which may a constitute a plurality of LED's for indicating the altitude range in which the detected aircraft lies. Alternatively, the display means 40 may display the exact altitude of the detected aircraft as desired by the manufacturer and user. It is noted that the embodiment of FIG. 4 allows those users which already have an radar detection system to obtain an aircraft detection system usable in conjunction therewith. This embodiment also allows pilots, who have no use for radar detection systems, to detect the presence of other aircraft in the vicinity of their own aircraft both easily and effectively. The aircraft detection system 30 as shown in FIG. 4 works in the same manner as previously described and may obviously be modified to include broader altitude ranges or the digital display of the detected altitudes of other aircraft to be useful to an aircraft pilot. Similarly, the detection system may be set so as to discriminate against the signals of the transponder aboard the aircraft on which the system is utilized so as to only indicate detection of other aircraft in the vicinity thereof.

Figure 5:
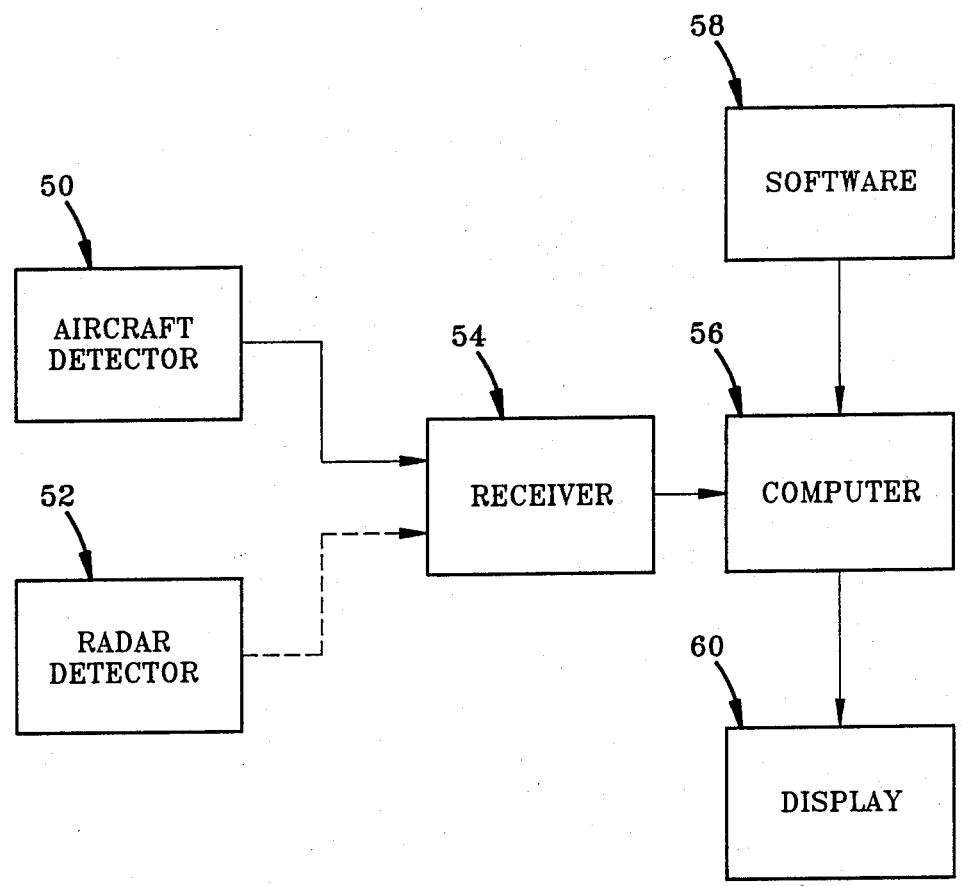
FIG. 5 is a simplified block diagram showing the associated circuitry of the detection system having combined aircraft and radar detection systems.

Turning now to FIG. 5, the associated circuitry of the detection system as shown in FIG. 1 will be described in more detail. A simplified schematic of detector 50 being an antenna system for reception of RF energy transmitted by an aircraft transponder. There may also be included a radar detector 50 if desired. The signals transmitted by an aircraft transponder or a radar source are conveyed to a simple receiver 54 which amplifies and demodulates the received signals. The signals received and processed by receiver 54 are supplied to a computer 56 for processing the received signals and discriminate against unwanted signals which may be received by the aircraft detector 50. The computer 56 operates under control of software 58 so as to discriminate between signals received by the aircraft detector 50 within a zone of interest and those which lie outside a zone of interest as desired. Alternatively, any received signals may be passed by means of user control as previously described. If a radar detector 52 is used in conjunction with the aircraft detector 50, the computer 56 allows separate processing of the signals. If both the aircraft detector 50 and the radar detector 52 receives signals simultaneously, the computer 56 will act to discriminate against the signals received by the aircraft detector 50 to alert the user to the presence of detected radar signals at 52 if desired. The information contained in the processed signals received at receiver 54 are then directed to a suitable display system 60 to indicate the type of signals received.

If signals are received by the aircraft detector 50, the information contained in the received signals will include the altitude of the aircraft from which the transponder signals were received. This altitude may then be displayed on the display 60 to alert the user to the presence of an aircraft in the vicinity thereof. The computer 56 may also act to discriminate against received signals so as to only display the reception of signals of aircraft which fall within a predetermined altitude range giving an indication of an aircraft speed detection operation. As described with reference to FIG. 2, the user function switches allow the user to adapt the processing of received signals so as to display received aircraft transponder signals falling within the predetermined altitude range or all signals at any indicated altitude of the aircraft. The aircraft lamp indicator is also lit upon the reception of the transponder signals by the aircraft detector 50 and an audio alert signal may be initiated.

If a radar detector 52 is to be used in conjunction with the aircraft detector 50, the computer 56 will operate to generate display signals indicating the presence of radar traffic control signals or the like. The reception of radar signals may also be utilized to illuminate the land LED indicator and to generate a display of the intensity of the received signals, as well as an indication of whether the received signals were generated from behind a target vehicle or whether a pulse type radar system is being utilized. It should be recognized that various alternatives may be incorporated into the system as desired or options eliminated to produce a more comprehensive detection system or a simplified system.

Figure 6:
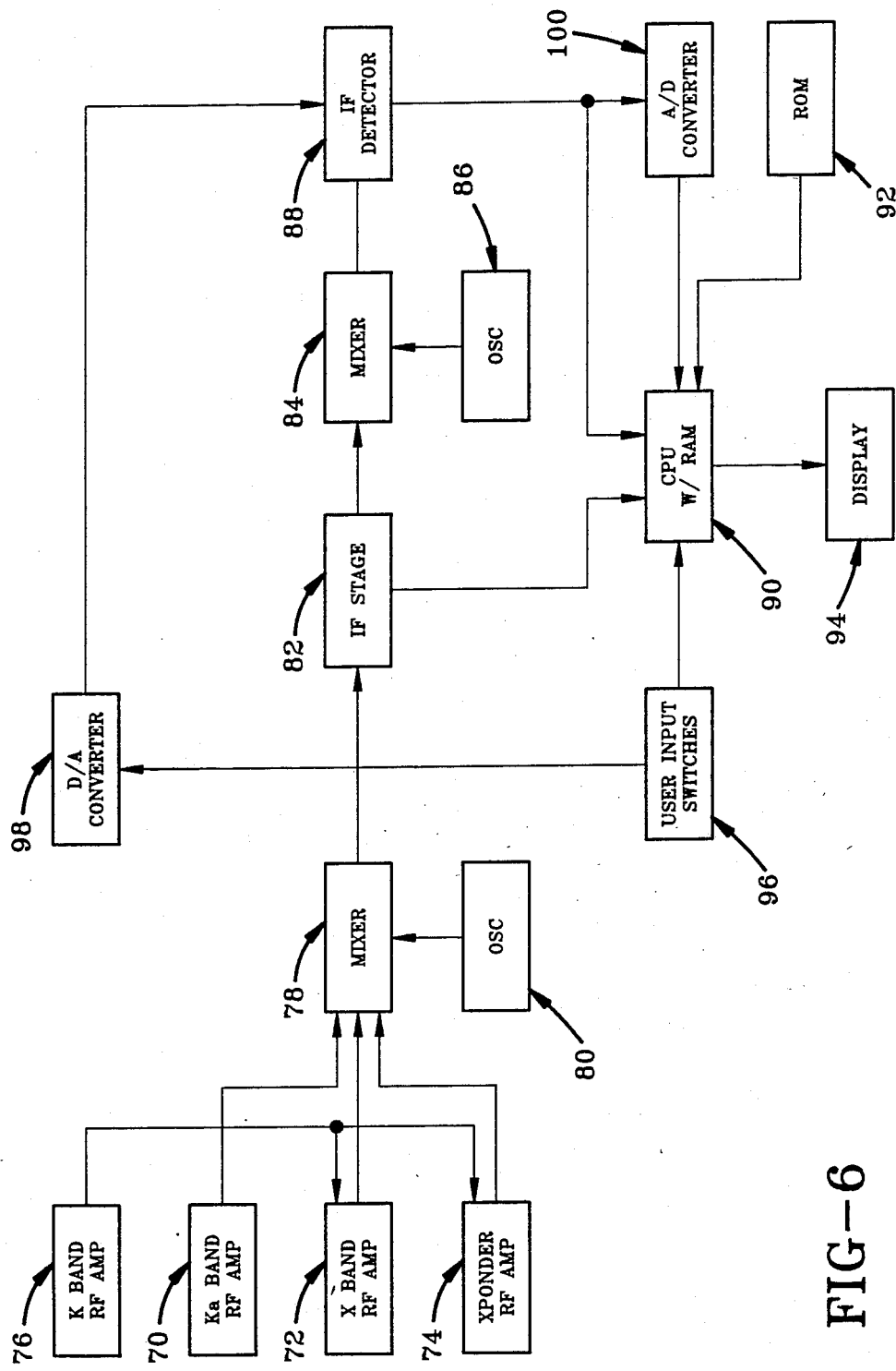
FIG. 6 is a more detailed representation of the associated circuitry of the detection system.

Turning now to FIG. 6, a more detailed description of the associated circuitry of the detection system is shown. The circuitry of the detection system may include a plurality of RF receivers tuned to particular bands of RF energy which are conventionally used in traffic radar speed detection units such as X or K band frequencies of RF energy. The received signals may be boosted by amplifiers 70 and 72 for the particular RF frequency detected from a radar speed detection unit. Also included is an RF receiver tuned to the frequency of RF energy generated by an aircraft transponder amplified at 74 and acting as the aircraft detector. A K-Band RF amplifier 76 is utilized to equalize the signals at the other frequencies such as X-Band and those of an aircraft transponder for subsequent processing. The received signals are directed to mixer 78 when they are combined with signals generated at a local oscillator 80 for demodulation of the received signals. The demodulated signals are transmitted to an intermediate frequency amplifier stage 82 to boost the signal such that the information contained therein may be used. In the event that only one type of RF energy is received, the amplified demodulated signals are supplied to a computer or CPU with a random access memory (RAM) 90 for processing. If both traffic radar speed detection RF energy and RF energy from an aircraft transponder are received simultaneously, the signals are further directed to mixer 84 to be combined with signals generated at a local oscillator 86 for further demodulation of the signals. The signals are directed to another intermediate frequency amplifier detector 88, and are then supplied to the CPU 90. It should be recognized that the intermediate stage amplifier 82 may supply radar traffic control signals to the CPU 90 while the IF detector 88 will supply to the CPU 90 the received signals of an aircraft transponder.

The CPU 90 is also supplied with control information from a read only memory 92 to carry out the desired functions of discriminating against unwanted signals as well as generating display signals to be directed to an appropriate display 94. The software contained in the read only memory (ROM) 92 may vary to achieve the desired functions as will be recognized by those skilled in the art. Also, as previously mentioned, there may be provided user input switches 96 for changing the operation of the CPU 90 to achieve various functions. Signals generated by these input switches 96 are transmitted to a digital to analog converter 98 to generate signals compatible with the received signals. The signals from the D-to-A converter 98 are supplied to the IF detector 88 and subsequently supplied to the CPU 90 via the analog to digital converter 100. In this manner, the appropriate display information may be provided to the CPU 90 to subsequently be displayed at display 94.

As previously described, the detection system circuitry will process a detected aircraft transponder signal so as to extract a reading from the aircraft altimeter to give an indication of the proximity of the aircraft to the detection system or target vehicle. This information may be discriminated against using the control information located in the read only memory 92 to display only the indication of aircraft in the vicinity of the detection system falling within a predetermined altitude range. The detection system may also be set to account for the elevation of an area on which the detection system is to be used so as to properly reflect the true altitude of an aircraft from the earth's surface. Alternatively, a lookup table may be provided so as to enable the user of the detection system to determine the actual altitude of an aircraft relative to the location at which the system is being utilized.

The display 94 may be a liquid crystal display to yield a digital read out of the altitude extracted from the received transponder signal or alternatively may simply be a row of LED's which will indicate the altitude range in which the received aircraft transponder system falls. This function may be combined with a radar detector of conventional design wherein the display may measure the proximity of the source of radar signals by the strength of the radar signals. The CPU 90 may also generate signals to initiate an audio alarm as well as a visual indication such as a LED of what kind of signals are being received by the detection system. Thus, it should be recognized that the detection system may be utilized to detect the presence of an aircraft in the vicinity of the detection system to indicate an aircraft speed detection and ticketing operation or alternatively, the presence of another aircraft within the vicinity of an aircraft on which the detection system is being utilized. The detection system may also be used in conjunction with a radar detection system to yield an effective means of detecting both radar speed detection and aircraft speed detection operations.

Figure 7:
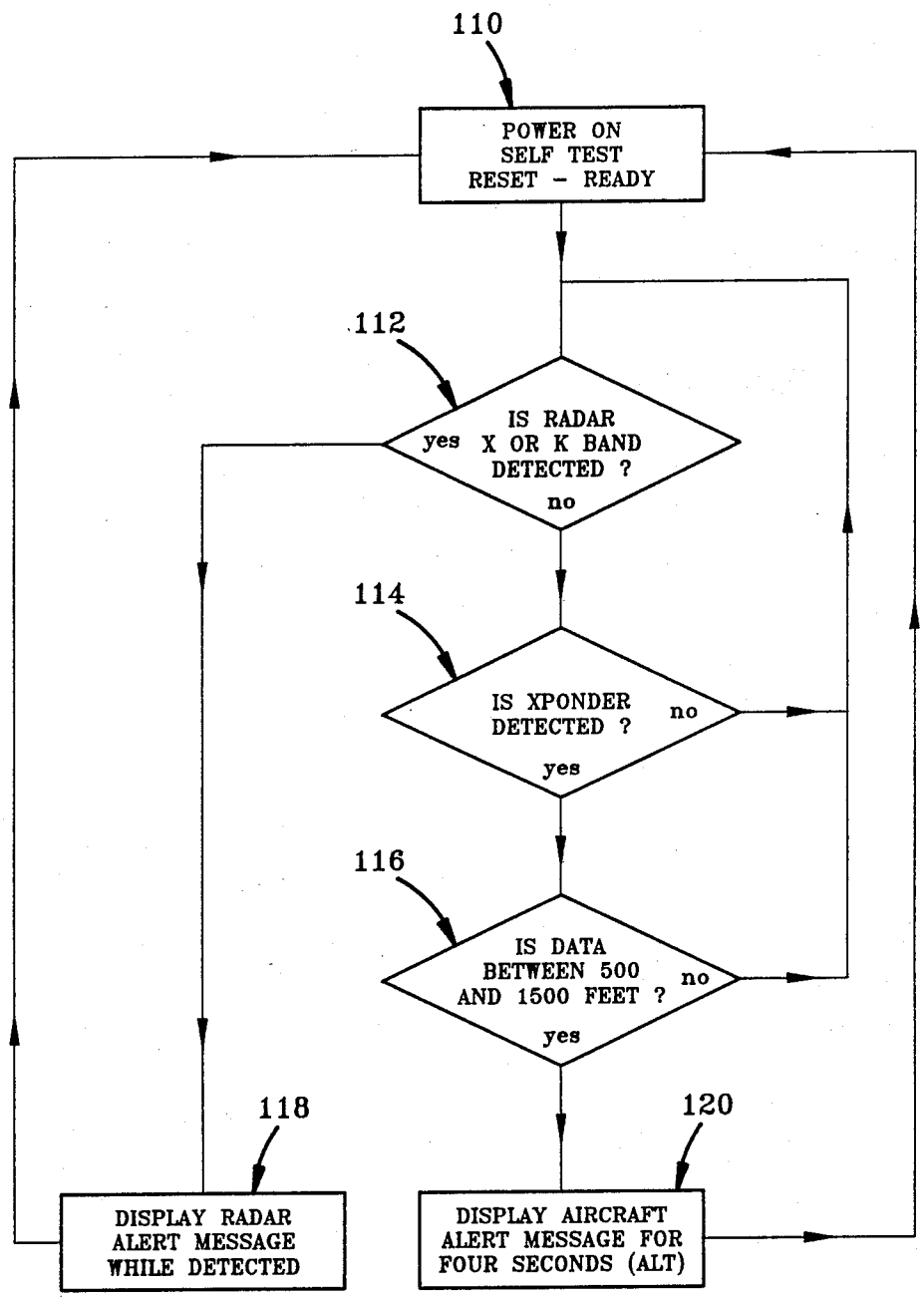
FIG. 7 is a flow chart of one embodiment of control functions to be performed in the associated circuitry for selective operation of the signaling and display means of the system.

Turning now to FIG. 7, a flow diagram of a control system which may be utilized from one embodiment of the invention is shown. When power is initially supplied to the detection system at step 110, a self-test reset routine may be initiated to ensure proper working condition of the system. At this point in the combined radar detection and aircraft detection embodiment of the invention, the detection circuit will first determine whether or not any radar signals are being received at step 112 indicating the presence of a radar speed detection operation. If no radar signals are being received, the system then determines whether or not any aircraft transponder signals are detected at step 114. If neither radar nor transponder signals are received, the control system reverts back to step 112 and repeats this operation.

In the event that radar signals are received at step 112, these signals will be processed and an appropriate display of the radar alert message will be displayed as long as the radar signals are being received at step 118. In the event that no radar signals are received, and an aircraft transponder signal is detected, this information will be processed to determine the altitude of the aircraft from which the signals were received. By utilizing the user input switches, the altitude information may be discriminated against to determine whether or not the detected aircraft's altitude lies between a predetermined altitude range at step 116. If, indeed, the detected aircraft lies between the predetermined altitude range, the aircraft alert message may then be displayed at step 120.

To account for the possibility that radar signals may be received subsequent to an aircraft detection, the aircraft alert message will be displayed for a predetermined amount of time and will then revert to step 110 and step 112 to again determine if radar signals are being received. In this way, any received radar signals will override a detected aircraft signal to give the user an indication of the use of radar speed detection equipment. It should be recognized that a wide variety of control systems may be utilized to yield the desired results and functions which are in the contemplation of the invention.

As is apparent from the above description, the detection system of the present invention enables effective detection of aircraft within the proximity of the detection system in an easy and cost effective manner. Further, the aircraft detection system may be used in conjunction with a radar detection system to provide a means of detecting both aircraft speed detection as well as radar speed detection operations as desired. This detection system allows various functions to be achieved for variable display of the information gained from detected signals, and allows discrimination of the detected signals as desired. It should be recognized that the detection system provides an extremely versatile and useful system for the detection of aircraft in the proximity of the system as well as other unique advantages. Although the present invention has been described in terms of preferred embodiments thereof, it is contemplated that alterations and modifications may be made without departing from the scope of the invention as defined in the appended claims.

What is claimed is:

1. A portable detection system for detecting the proximity of an aircraft comprising:
    a portable housing including receiver means to passively detect RF energy transmitted by an aircraft transponder in the vicinity of the detection system which includes altitude information of the aircraft,
    signal processing means including a means for selective discrimination of the RF energy within an altitude range of 2500 feet to define an aircraft in a certain altitude band, and
    signaling means to indicate reception of said discriminated signals.

2. A portable detection system as in claim 1, wherein, said receiver means comprises an RF receiver tuned to the frequency of said transponder signals.

3. A portable detection system as in claim 1, wherein, said signaling means comprises an audio alert as well as a display means for indicating said altitude.

4. A portable detection system as in claim 3, wherein, said display means is a liquid crystal display operating to display digitized signals representing said altitude.

5. A portable detection system as in claim 3, wherein, said display means is a plurality of LED means each of which is operable when a predetermined altitude is received.

6. A portable detection system as in claim 1, wherein, said signal processing means comprises a computer means generating electrical signals directed to said signaling means.

7. A portable detection system as in claim 6, wherein said computer means is a CPU with a random access memory having control information stored in a read-only memory for controlling the function of said computer means.

8. A portable detection system as in claim 1 wherein such means for selective discrimination further comprises user input switches to enable modification of said signal processing means to discriminate against received signals so as to prevent their transmission to said signaling means,
    said user input switches also enabling control of said signaling means.

9. A portable detection system as in claim 1, wherein, said signaling means comprises an audio alert as well as a display means for indicating said altitude.

10. A portable detection system as in claim 9, wherein,
    said display means is a liquid crystal display operating to display digitized signals representing said altitude.

11. A portable detection system as in claim 9, wherein,
    said display means is a plurality of LED means each of which is operable when a predetermined altitude is received.

12. A portable detection system comprising
    a radar detection system including receiver means tuned to the frequency of radar signals to be detected, an aircraft detection system including receiver means tuned to the frequency of signals transmitted by an aircraft transponder, signal processing means which receive signals from said radar detection system and selectively discriminate signals from said aircraft detection system to define aircraft in a selected altitude band, and to generate warning and presence of radar signals or any aircraft in the selected altitude band in the vicinity of said detection system, and signaling means to receive said warning and display signals from said signal processing means to yield an indication of the operation of radar of the presence of aircraft in a selected altitude band in the vicinity of said detection systems.

13. A portable detection system as in claim 12, wherein, said signal processing means acts to discriminate against unwanted signals received by said receiving means.

14. A portable detection system as in claim 12, wherein, said signal processing means acts to discriminate against a plurality of received signals so as to allow a desired signal to be transmitted to said signaling means.

15. A system as in claim 12, wherein said receiver means includes first mixer means coupled with said antenna means and first oscillator means for mixing said RF signals and a predetermined frequency from said oscillator means to demodulate said RF signals and produce IF output signals.

16. A system as in claim 15, wherein said receiver means further includes second mixer means coupled with said first mixer means and second oscillator means to receive said IF output signals and to further demodulate said received signals to account for a plurality of said RF signals being received simultaneously.

17. A portable detection system as in claim 12, wherein, said receiver means includes amplifying means to boost signals received from said radar and aircraft detection systems, the received signals being directed to a mixer at which they are demodulated to produce intermediate frequency signals which are transmitted to said signal processing means.

18. A portable detection system as in claim 12, wherein, said signal processing means is a computer means including a CPU having read only and random access memories to control the function of said computer means.

19. A portable detection system as in claim 12, further comprising user input switches to enable modification of said processing means to discriminate against received signals so as to prevent their transmission to said signaling means, said user input switches also enabling control of said signaling means.

* * * * *